Feb. 5, 1952          S. M. MARCO          2,584,897
ELECTRIC COMPUTING MECHANISM
Filed Feb. 10, 1947          2 SHEETS—SHEET 1
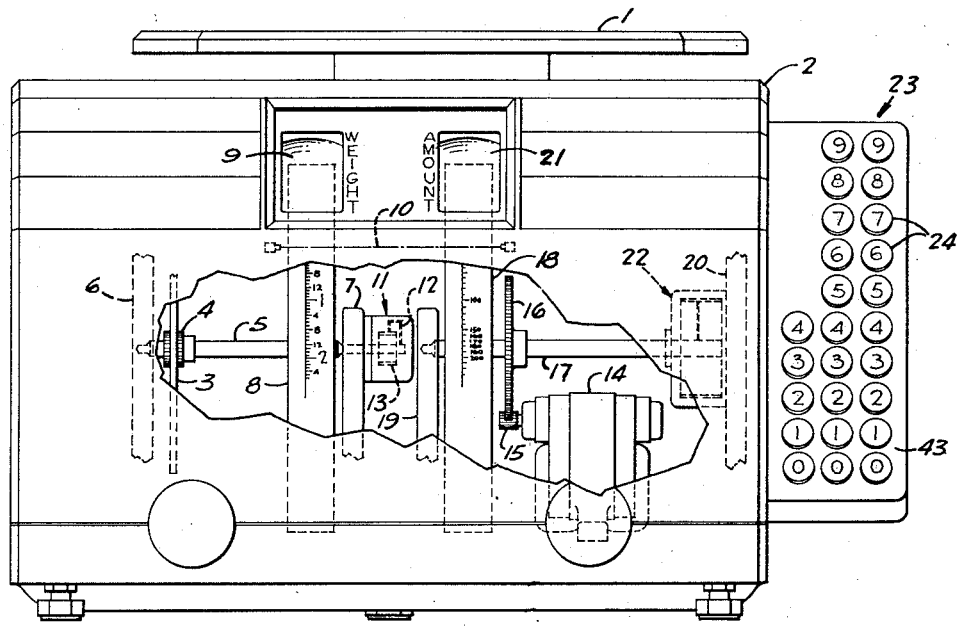
*Fig. I*
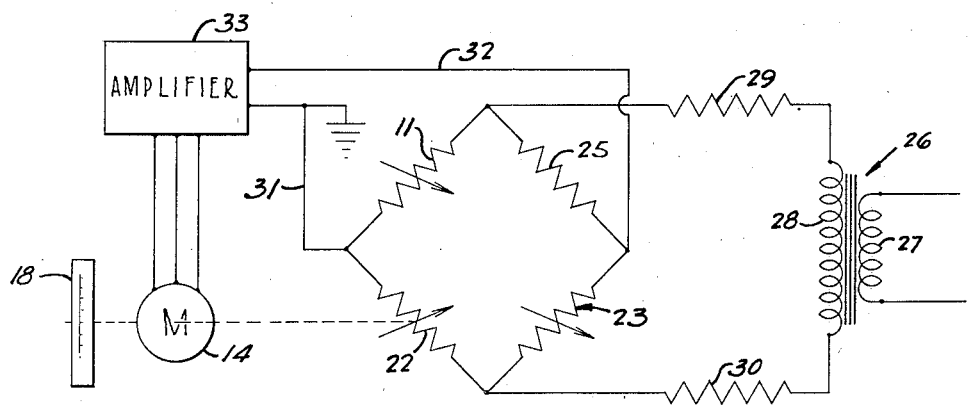
*Fig. II*
INVENTOR.
Salvatore M. Marco
BY
Marshall and Marshall
ATTORNEYS Feb. 5, 1952　　　　　S. M. MARCO　　　　　2,584,897
ELECTRIC COMPUTING MECHANISM
Filed Feb. 10, 1947　　　　　　　　　　　　　2 SHEETS—SHEET 2
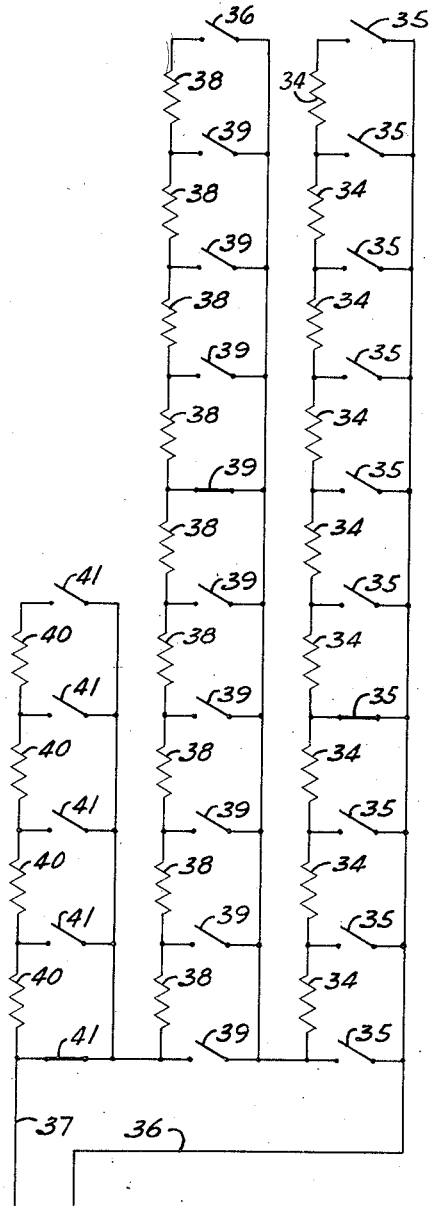
Fig. III
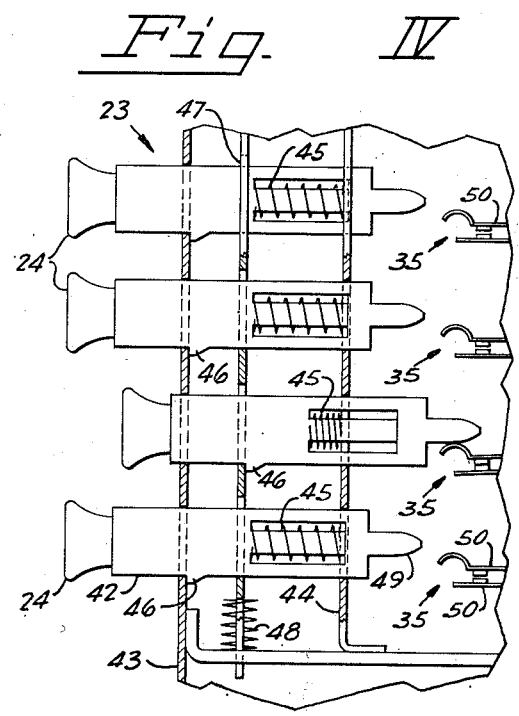
Fig. IV
INVENTOR.
Salvatore M. Marco
BY
Marshall and Marshall
ATTORNEYS Patented Feb. 5, 1952

2,584,897

UNITED STATES PATENT OFFICE 2,584,897

ELECTRIC COMPUTING MECHANISM

Salvatore M. Marco, Columbus, Ohio, assignor to Toledo Scale Company, Toledo, Ohio, a corporation of New Jersey Application February 10, 1947, Serial No. 727,679

2 Claims. (Cl. 265—36)

This invention relates to a computing apparatus and in particular to a computing mechanism attached to a weighing scale for automatically indicating the cost of an article that is being weighed on the scale.

In retail trade, particularly in meat markets, it is particularly advantageous to have the weighing scale not only indicate the weight of an article of merchandise but also to indicate the cost of the article as determined by its weight at a given price per unit of weight. Weighing scales have been equipped with computed value charts, i. e. charts having a plurality of rows of indicia, wherein each row of indicia is computed at a different price per unit of weight. While this arrangement provides computed amount indications it is somewhat inconvenient because the operator must always select the proper row of indicia when he reads the scale.

The principal object of this invention is to provide a computing attachment for a weighing scale, which attachment automatically computes the amount and drives an indicator or indicating chart to a position to indicate the amount.

Another object of the invention is to provide a computed indication in which the power required for driving the computed indication indicator is not taken from the weighing scale.

A still further object of the invention is to utilize a Wheatstone bridge circuit for automatically providing computed amount indications.

These and other objects and advantages are apparent from the following description in which reference is made to the accompanying drawings.

In the drawings:

Figure I is a front elevation, with parts broken away, of an automatic weighing scale incorporating the invention.

Figure II is a schematic wiring diagram illustrating the cooperation of the elements included in the improved computing mechanism.

Figure III is a wiring diagram showing the arrangement of the price setting portion of the computing device.

Figure IV is a fragmentary vertical section showing the construction of the price setting keys of the improved device.

These specific drawings and the accompanying description are intended merely to illustrate the invention and not to impose limitations on the claims.

According to the invention a plurality of adjustable resistors are connected as a bridge circuit and the bridge circuit is kept in balance by a motor that adjusts the resistance of one arm of the bridge circuit. Three arms of the bridge circuit are adjustable resistances, while the fourth arm is a fixed resistance. One of the adjustable resistance arms consists of a rheostat that is driven from the indicator shaft of the weighing scale and that is adjusted so that its resistance is directly proportional to the load on the weighing scale. Another arm of the bridge consists of a series of resistances that are switched into or out of the circuit by manipulation of a series of price setting keys. The third adjustable arm of the bridge consists of a rheostat that is automatically adjusted by the motor so as to keep the bridge in balance. Connection of the weight sensitive rheostat and the price setting series of resistances in opposite arms of a Wheatstone bridge, using a fixed resistance for another arm and using the motor adjusted rheostat as the fourth arm allows continuous computation and indication of amount values because, as long as the bridge circuit is in balance, the resistance of the motor adjusted rheostat is proportional to the product of the resistances of the weight adjusted rheostat and the price setting resistance.

The improved computing device may be used in a box-type weighing scale in which a weighing platter 1 surmounts a housing 2 that encloses the weight counterbalancing and weight indicating mechanism of the weighing scale. The interior construction and the details of the load counterbalancing mechanism for such a weighing scale is illustrated in U. S. Patent No. 2,066,624 dated January 5, 1937.

Forces from loads placed on the platter 1 are transmitted through a lever system to a pendulum counterbalance that, in turn, drives a rack 3 through a distance that is proportional to the magnitude of the load on the platter 1. The rack 3 meshes with a pinion 4 mounted on an indicator shaft 5 that is journaled in standards 6 and 7 erected from the base of the housing 2. The indicator shaft 5 carries an indicia bearing chart 8, the indicia of which are visible through a window 9 located in the upper portion of the housing 2. A filament or thread 10 stretched across the field of view of the window 9 serves as a reading line or index that cooperates with the indicia bearing chart 8 to indicate the magnitude of the load on the platter 1. A low torque potentiometer or rheostat 11 is mounted on the standard 7 with its movable contact arm 12 connected to the indicator shaft 5 such that the arm is driven over a resistance wire element 13 by rotation of the indicator shaft 5. The potentiometer 11 is one of the type in which a fine brush included in the movable arm 12 contacts the resistance wire element 13 so that very little force is required to overcome the friction between the brush and the wire. The potentiometer or rheostat 11 thus serves as a resistance element, the resistance of which is directly proportional to a load being weighed on the scale.

A motor 14 connected through gears 15 and 16 drives a shaft 17 on which a second indicia bearing chart 18 is mounted. The shaft 17 is journaled in a pair of standards 19 and 20 erected from the base of the scale. Indicia on the second chart 18 are carried past the filament 10 constituting the reading line, and the indicia at and near the reading line 10 may be observed through a second window 21 located in the upper portion of the housing 2 alongside the first window 3.

The motor driven shaft 17 also drives the movable arm of a rheostat or a potentiometer 22 that serves as a resistance that is proportional to the angular position of the shaft 17 and therefore the amount indicated in the window 21.

A price setting mechanism 23 mounted on the end of the housing 2 includes a plurality of resistances that are connected in circuit according to which ones of price setting keys 24 are depressed. The electrical resistance afforded by the price setting mechanism is proportional to a price that is set up by depressing certain of the keys 24.

Referring to Figure II the scale driven potentiometer 11, the resistances of the price setting mechanism 23, the motor driven potentiometer or rheostat 22 and a fixed resistance 25 are connected as a Wheatstone bridge in which the scale driven potentiometer 11 and the price setting mechanism 23 are opposite each other. Therefore, as long as the bridge is balanced, the resistance of the motor driven rheostat 22 is proportional to the product of the resistances of the weight rheostat 11 and the price setting resistance 23 with the result that the shaft 17 and the indicia bearing chart 18 are rotatively positioned to indicate the computed amount or money value of the load on the scale.

Alternating current power is supplied to the bridge circuit through a transformer 26 having a primary 27 connected to the source of power and having a secondary 28 connected through series resistors 29 and 30 to one diagonal of the Wheatstone bridge circuit. The series resistors 29 and 30 are necessary to limit the current flow when the load is zero or small and the bridge is balanced. Under these conditions the rheostat 11 has very low resistance and likewise the rheostat 22 is set at a very small resistance value.

The other diagonal of the bridge is connected through leads 31 and 32 to an amplifier 33 that serves to increase the unbalance voltage of the Wheatstone bridge circuit to a value sufficient to operate the motor 14. The amplifier and motor connections are arranged so that the motor drives the rheostat 22 in a direction to restore the Wheatstone bridge circuit to balance after a change in either the price or the weight of the commodity on the scale.

The use of the series resistors 29 and 30 between the transformer 26 and the Wheatstone bridge circuit offers an advantage other than the limitation of current flow. If the resistance of the resistors 29 and 30 is much greater than the maximum resistance of the bridge circuit and the voltage of the transformer 26 is increased to secure the desired current flow through the bridge circuit, the unbalance voltage that is fed to the amplifier 33 for a given absolute error in resistance of the amount potentiometer or rheostat 22 will be substantially constant throughout the range of adjustment of the amount. Thus, if the amplifier 33 is sufficiently sensitive to balance to the least monetary unit at one price and weight it will balance to the same precision at any other selected price and weight.

Referring to Figure III the resistances of the price setting mechanism 23 may take the form of a first series of resistors 34 having unit resistance and each representing one cent in the price. A series of switches 35 are provided such that any number of the unit value resistors 34 may be inserted in the circuit between the input and output leads 36 and 37. Thus if the price ends in a zero the first switch—the zero switch—is closed and the others are left open. If the price ends in a number other than the zero one of the others of the switches 35 is closed, the switch being selected to include a number of the resistors 34 equal to the cents digit of the price.

A second series of resistors 38 each having a resistance of ten units are selected by means of a series of switches 39 so as to include a number of the resistors 38 corresponding to the dimes digit of the price. Likewise a third series of resistors 40 selected by switches 41 have resistances of one hundred units each and are used to insert the dollar value of the price.

In Figure III the first of the switches 41, the sixth of the switches 39, and the fourth of the switches 35 are shown in their closed positions. The price so selected is 53 cents because there are none of the resistors 40 included in the circuit, there are five of the resistors 38 included, and there are three of the resistors 34 thus making a total of 53 units of resistance. The term "units of resistance" is used in preference to "ohms" because the ohms per unit of resistance is selected according to the range of resistance values used in the other arms of the bridge circuit.

Figure IV illustrates a suitable type of latching push button switch for selecting the resistors 34, 38 or 40 in the price setting mechanism. Each of the keys 24 has a downwardly extending portion 42 that is guided by the cover 43 of the mechanism housing and a shelf 44 extending parallel to the cover. Each of the keys 24 is urged upwardly by a helical compression spring 45 that engages the key portion 42 and the shelf 44. The upward travel of each of the keys 24 is limited by engagement of a tooth 46 projecting from the edge of the key portion 42 and the lower surface of the cover 43 of the housing. The selected one of the keys 24 for each bank of keys is held in depressed position by a latch bar 47 that engages the upper surface of the tooth 46. The latch bar 47 is moved longitudinally against a compression spring 48 as a key is depressed so that the actuation of one key of a bank serves to release any previously depressed key. Each of the key portions 42 has its lowermost end 49 shaped to force one of a pair of springs 50 that, together, constitute one of the switches 35, 39 or 41 into its closed position.

The improved computing device offers several advantages in that it does not impose an appreciable load on the weighing mechanism, it does not affect the speed of response of the weighing mechanism and the price may be selected before, during or after the weighing operation. This type of computing mechanism is particularly desirable when a customer asks for a certain amount of a commodity and states the amount in terms of cost rather than in terms of weight. In this situation the merchant sets up the price on the keys 24 and then puts a sufficient amount of the commodity onto the platter 1 to bring the amount indicia bearing chart 18 to the required monetary value. An error in setting up the price may be rectified without first removing the load and resetting the computing mechanism to zero as is necessary with ordinary types of computing mechanism.

Various modifications of the structure and the components of the improved computing device may be made without departing from the spirit and scope of the invention.

Having described the invention, I claim:

1. In a device for computing from weight and price and indicating the cost of an article, in combination, a bridge circuit, a source of substantially constant current for energizing the bridge circuit, means for weighing the article, a rheostat operated by said means for inserting resistance proportional to the weight of the article into one arm of the bridge, a price setting mechanism for inserting resistance proportional to price into an opposite arm of the bridge, a constant resistance in another arm of the bridge, motor driven mechanism for inserting resistance into the fourth arm of the bridge, an electronic circuit for detecting unbalance in the bridge and for driving the motor driven mechanism to reduce the unbalance, and a cost indicator driven by the motor driven mechanism.

2. In a computing weighing scale, in combination, a weighing mechanism, a weight indicator driven by the weighing mechanism, a rheostat operatively connected to the weighing mechanism, a price setting mechanism including switching means, a plurality of resistors connected to the switching means and inserted in circuit according to the selection on the price setting mechanism, a fixed resistance element, a second rheostat, a motor for driving the second rheostat, said rheostats with the fixed resistance element and the plurality of resistors being connected as a Wheatstone bridge, means sensitive to the unbalance voltage of the bridge for controlling the motor, and a cost indicator driven by the motor for indicating the cost of a commodity weighed on the scale as computed according to a selected price.

SALVATORE M. MARCO.

REFERENCES CITED

The following references are of record in the file of this patent:

UNITED STATES PATENTS

| Number | Name | Date |
|---|---|---|
| 1,298,302 | Davis | Mar. 25, 1919 |
| 1,573,850 | Naiman | Feb. 23, 1926 |
| 1,847,105 | Spitglass | Mar. 1, 1932 |
| 1,994,757 | De Florez et al. | Mar. 19, 1935 |
| 2,108,146 | Simpson | Feb. 15, 1938 |
| 2,373,504 | Schlieben et al. | Apr. 10, 1945 |
| 2,443,098 | Dean | June 8, 1948 |

FOREIGN PATENTS

| Number | Country | Date |
|---|---|---|
| 848,330 | France | July 24, 1939 |